(12) United States Patent
Eiger et al.

(10) Patent No.: US 7,827,581 B1
(45) Date of Patent: Nov. 2, 2010

(54) WIRELESS MULTIMEDIA SYSTEM

(75) Inventors: Tuvia Eiger, North Bellmore, NY (US); Uriel Berchin, Forest Hills, NY (US)

(73) Assignee: BE Labs, Inc., East Meadow, NY (US)

( * ) Notice: Subject to any disclaimer, the term of this patent is extended or adjusted under 35 U.S.C. 154(b) by 2773 days.

(21) Appl. No.: 09/796,270

(22) Filed: Feb. 28, 2001

Related U.S. Application Data

(60) Provisional application No. 60/185,862, filed on Feb. 29, 2000.

(51) Int. Cl.
  *H04N 7/173* (2006.01)
  *H04N 7/20* (2006.01)
  *H04N 7/14* (2006.01)
  *H04N 7/16* (2006.01)

(52) U.S. Cl. .............................. 725/81; 725/6; 725/31; 725/108; 370/401; 370/431; 455/73

(58) Field of Classification Search ................ 348/734; 725/31, 108, 6, 74, 81, 101; 370/264, 401, 370/431; 455/73; 375/73
See application file for complete search history.

(56) References Cited

U.S. PATENT DOCUMENTS

| | | | | |
|---|---|---|---|---|
| 5,371,548 | A | * | 12/1994 | Williams ..................... 348/478 |
| 5,398,070 | A | * | 3/1995 | Lee ............................. 348/553 |
| 5,613,190 | A | | 3/1997 | Hylton |
| 5,630,204 | A | | 5/1997 | Hylton et al. |
| 5,708,961 | A | | 1/1998 | Hylton et al. |
| 5,724,646 | A | * | 3/1998 | Ganek et al. .................. 725/89 |
| 5,729,535 | A | | 3/1998 | Rostoker et al. |
| 5,768,539 | A | * | 6/1998 | Metz et al. .................. 709/249 |
| 5,793,413 | A | | 8/1998 | Hylton et al. |
| 5,794,116 | A | * | 8/1998 | Matsuda et al. ............. 725/114 |
| 5,835,128 | A | | 11/1998 | MacDonald et al. |
| 5,880,721 | A | * | 3/1999 | Yen .............................. 725/81 |
| 5,936,949 | A | | 8/1999 | Pasternak et al. |
| 6,124,878 | A | * | 9/2000 | Adams et al. ............... 725/118 |
| 6,131,130 | A | | 10/2000 | Van Ryzin |

(Continued)

FOREIGN PATENT DOCUMENTS

EP 0 935 364 A2 8/1999

(Continued)

*Primary Examiner*—Christopher Kelley
*Assistant Examiner*—Reuben M Brown
(74) *Attorney, Agent, or Firm*—Nolte, Nolte & Hunter; Christopher B. Garrey

(57) ABSTRACT

A customer premises installation has a wireless multimedia center (WMC) for reception from one or more signal sources and for distribution of segments of signals from signal sources through the wireless multimedia center to a plurality of end units, in which the signals include video signals and broadband data. The wireless multimedia center receives all the signals and distributes segments of said signals via a transmitter. The video signals are transmitted by orthogonal frequency division multiplexing in which all signals are added together and summed as an orthogonal array having dimensions of time, frequency and amplitude, to transmit spread spectrum multiplexed signals. Each pulse has sufficiently long individual pulse widths to defeat multi-path, reflection and absorption phase induced losses. The video signals are distributed to one or more end units. The end units communicate with the wireless multimedia center, controlling which segments of which signals are distributed to each end unit.

43 Claims, 8 Drawing Sheets

U.S. PATENT DOCUMENTS

| | | | |
|---|---|---|---|
| 6,151,490 A | 11/2000 | Schultheiss | |
| 6,173,326 B1* | 1/2001 | Collins | 709/229 |
| 6,175,550 B1* | 1/2001 | van Nee | 370/206 |
| 6,334,216 B1* | 12/2001 | Barth | 725/30 |
| 6,353,929 B1* | 3/2002 | Houston | 725/20 |
| 6,546,055 B1* | 4/2003 | Schmidl et al. | 375/244 |
| 6,560,234 B1* | 5/2003 | Ben-Michael et al. | 370/401 |
| 6,609,010 B1* | 8/2003 | Dolle et al. | 455/552.1 |
| 6,732,369 B1* | 5/2004 | Schein et al. | 725/39 |
| 6,954,859 B1* | 10/2005 | Simerly et al. | 726/3 |

FOREIGN PATENT DOCUMENTS

| | | |
|---|---|---|
| IT | 1 281 947 B1 | 3/1998 |
| JP | 11055211 | 2/1999 |

\* cited by examiner

A Unified Multimedia Distributon System

WMS-A:
Wireless Multimedia System - Analog Services

Universal End Unit

Example:
Residential property

A Unified Multimedia & Control Distributon System

WIRELESS MULTIMEDIA SYSTEM

CROSS-REFERENCE TO RELATED APPLICATIONS

This converts Provisional Patent Application 60/185,862 to a utility application taking benefit under 119(e) of its filing date of Feb. 29, 2000.

STATEMENT REGARDING FEDERALLY SPONSORED RESEARCH OR DEVELOPMENT

None.

REFERENCE TO A MICROFICHE APPENDIX

See 37 CFR 1.96(C)

None.

BACKGROUND OF THE INVENTION (1) Field of the Invention

This invention relates to a wireless distribution system for home or business comprising a unitary distribution box, called a wireless multimedia center, which has inputs for receiving signals from one or more sources. Signals are then re-broadcast throughout the site by low energy digital transmissions, at energy levels just above background radiation. These signals are transmitted to and received by individual transceivers, called end units (EU), located throughout the site.

(2) Description of Related Art Including Information Disclosed Under 37 CFR 1.97 and 37 CFR 1.98

An information disclosure statement will be filed later.

BRIEF SUMMARY OF THE INVENTION

This invention relates to a wireless distribution system for home or business comprising a unitary distribution box, called a wireless multimedia center (WMC), which has inputs for receiving signals from one or more of: a satellite dish; a terrestrial antenna such as a VHF/UHF; a cable line; a telephone or data line such as ISDN, DSL, etc.; and/or fiber optic line, and any other future data or program sources can also be transparently input to the WMC with appropriate modifications or modular plug-ins.

Signals input are then re-broadcast, using OFDM technology, throughout the premises by low energy digital transmissions, at energy levels just above background radiation. These signals are transmitted to and received by individual transceivers, called end units (EU), located throughout the premises. These EU transceivers are presently contemplated as a video end unit (VEU) for TV and radio, and a communications end unit (CEU), for telephone and data.

The data channel instructs the WMC which program and data signals to send to which EU. Special multiplexing techniques result in extraordinary bandwidth and channel capacity.

DETAILED DESCRIPTION OF THE INVENTION

Figure 1:
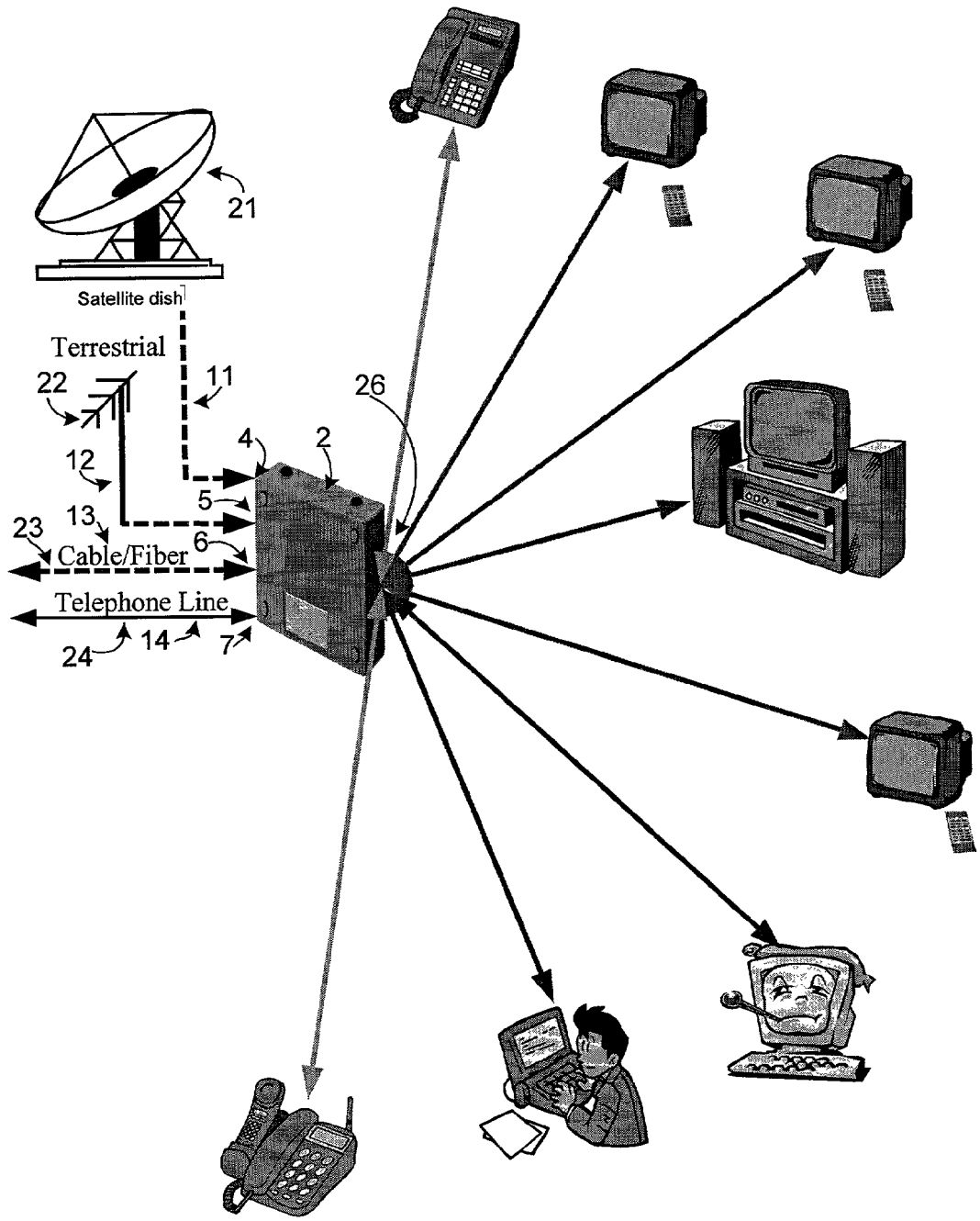
FIG. 1 is a block diagram of a unified multimedia distribution system of the present invention

As in FIG. 1, this invention relates to a wireless distribution system for home or business, comprising a unitary distribution box 2, called a wireless multimedia center (WMC), which has inputs for receiving signals 11-14 from one or more of:
- a satellite dish 21;
- a terrestrial antenna 22;
- a cable input/output line 23; and/or
- a telephone or data line 24 [ISDN, DSL, etc].

Signals input are then re-broadcast, using OFDM technology, throughout the premises by low energy digital transmissions 26, at energy levels just above background radiation. As in FIG. 2, these signals are transmitted to, and received by, individual transceivers 31-36 located throughout the premises. These transceivers are presently contemplated as:
- video end unit 31-33, for
  - television receivers 41-43;
  - VCRs;
  - AM/FM broadcasting;
- Communications end unit 34-36, for:
  - computers 46;
  - telephones 36,
  - faxes,
  - answering machines,
  - other telephonic devices, and
  - any other electronic apparatus.

Figure 4:
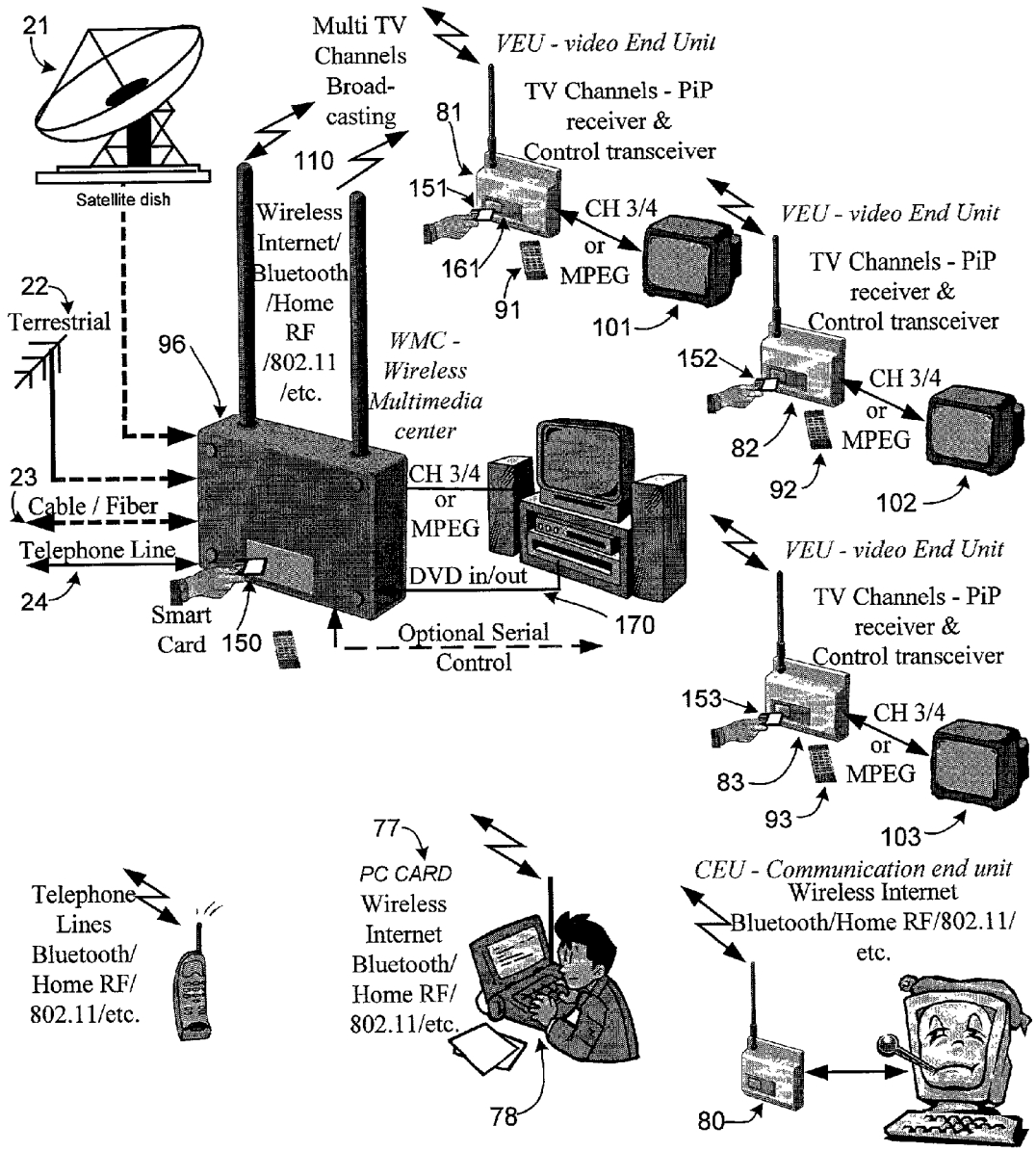
FIG. 4 is a block diagram of a unified multimedia distribution system of the present invention showing digital services.

FIG. 4 shows a universal end unit 47, incorporating both Analog VEU 48 and digital VEU 49 and a CEU 50.

A VEU may be a set-top box 31-33 (FIG. 2) or may be incorporated in a TV set instead of, or in addition to, a conventional tuner. As in FIG. 3, an analog VEU 48 will incorporate a digital to analog converter 52 and analog connectors, such as RCA connectors 61-63, SVHS 64, or RF co-ax 65 on a set top box.

Figure 3:
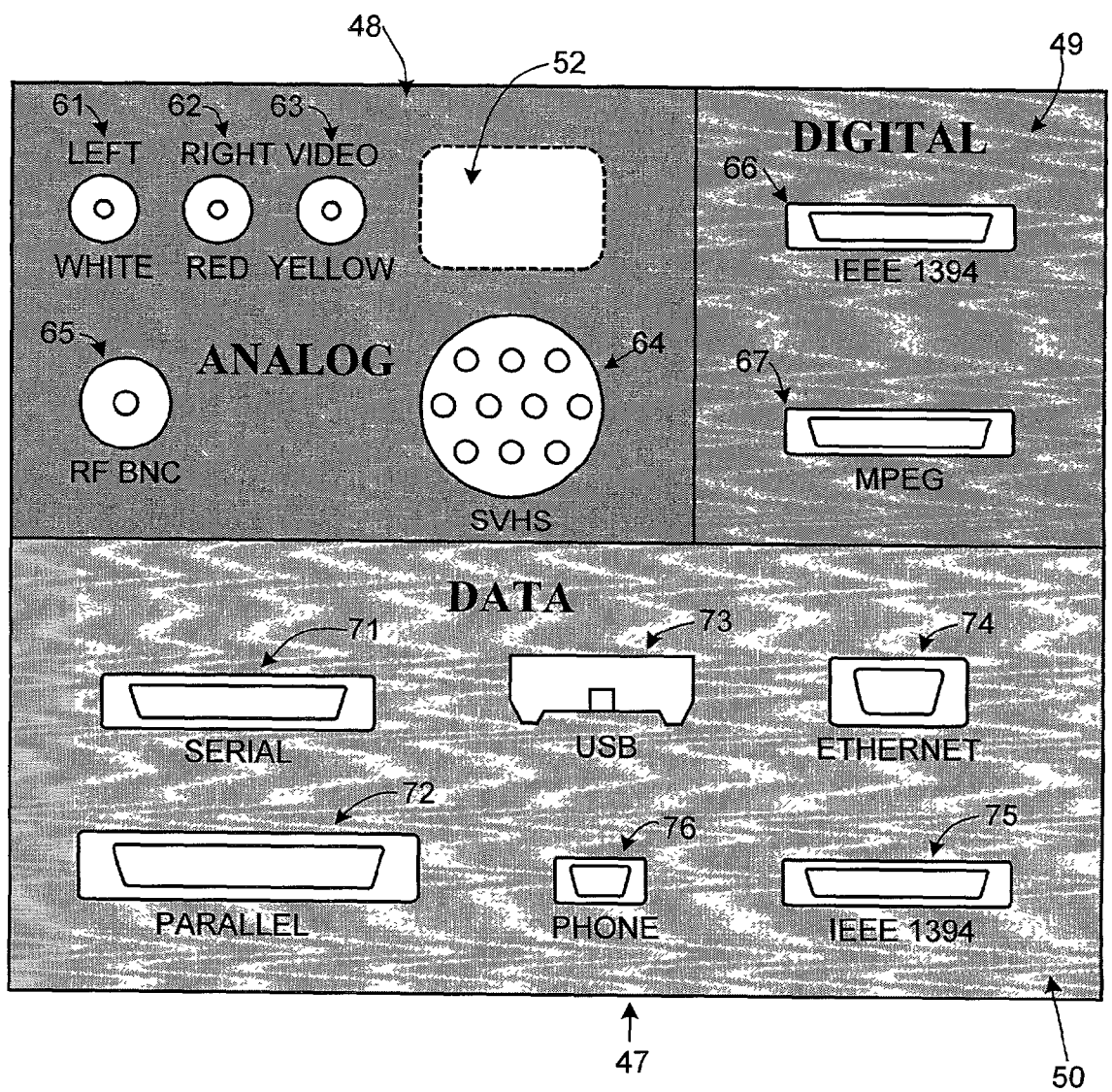
FIG. 3 is an elevation of a connector mounting surface of an end unit of the present invention.

As in FIG. 3, a digital VEU 49 can omit the digital to analog converter and will have digital connectors, on a set top box, such as IEEE 1394 66, and/or MPEG 67 connectors.

An EU can be universal, analog, digital or both, communications, or any combination.

The telephones may either: have wireless communications end units as adapters, or may be standard digital encrypted cordless phones, operating on standard digital cordless phone signals, whereby the wireless multimedia center (WMC) takes the place of various telephone base stations in transmitting the cordless telephone signals throughout the house.

Transceiving communications end units (CEU) may be separate boxes 50 with various ports such as: serial 71, parallel 72, USB 73, Ethernet 74, IEEE 1394 75 or telephone-and/or-fax-and/or-modem 76. Alternatively, as in FIG. 4, a CEU PC card 77 may be inserted into a computer 78.

Transceiving end units 80 may be adapted to Internet communication terminals; lap-top computers; or personal information managers, such as the Palm Pilot™.

Where the transceiver is a video end unit 81-83, an associated remote control unit 91-93 selects programming that will be transmitted from the WMC 96, and displayed on the television or radio receiver 101-103 associated with that video end unit 91-93. Thus, where there were 3 TVs 101-103 in the house, there would be 3 video end units 91-93, one for each television receiver 101-103. Each video end unit 81 would have its own remote controller 91 capable of selecting channel sourcing from satellite dish 21, cable 23, roof antenna 22, or any other program source. The video end unit 81 would tell the WMC 96 what signal the VEU was instructed to receive, and the wireless multimedia center (WMC) 96 would select and tune in on that signal and direct a transmission 110 receivable by that video end unit 81. Each video end unit 81 can be instructed to receive two channels to provide picture-in-picture, or a single channel in which the WMC incorporates a first and a second program as a picture-in-picture. VEU's can receive other services such as custom individually tailored advertisements or billing messages, possibly as picture-in-picture.

Software for the system, including video, computer or programmable telephonic services can be maintained and upgraded remotely by the service provider.

Similar simultaneous services, such as simultaneous fax and telephone or individually tailored on-hold messages, can use the multichannel capability of each end unit: VEU or communications end unit.

The multiple video end units could be simultaneously receiving streaming digital data from the central control unit for as many different programs as the allocated channels allow. Each digital channel in the present scheme allows up to 10 simultaneous programs to be transmitted to 10 different end units in the available bandwidth. This limit of ten is a matter of present convenience and may vary in future embodiments.

Figure 2:
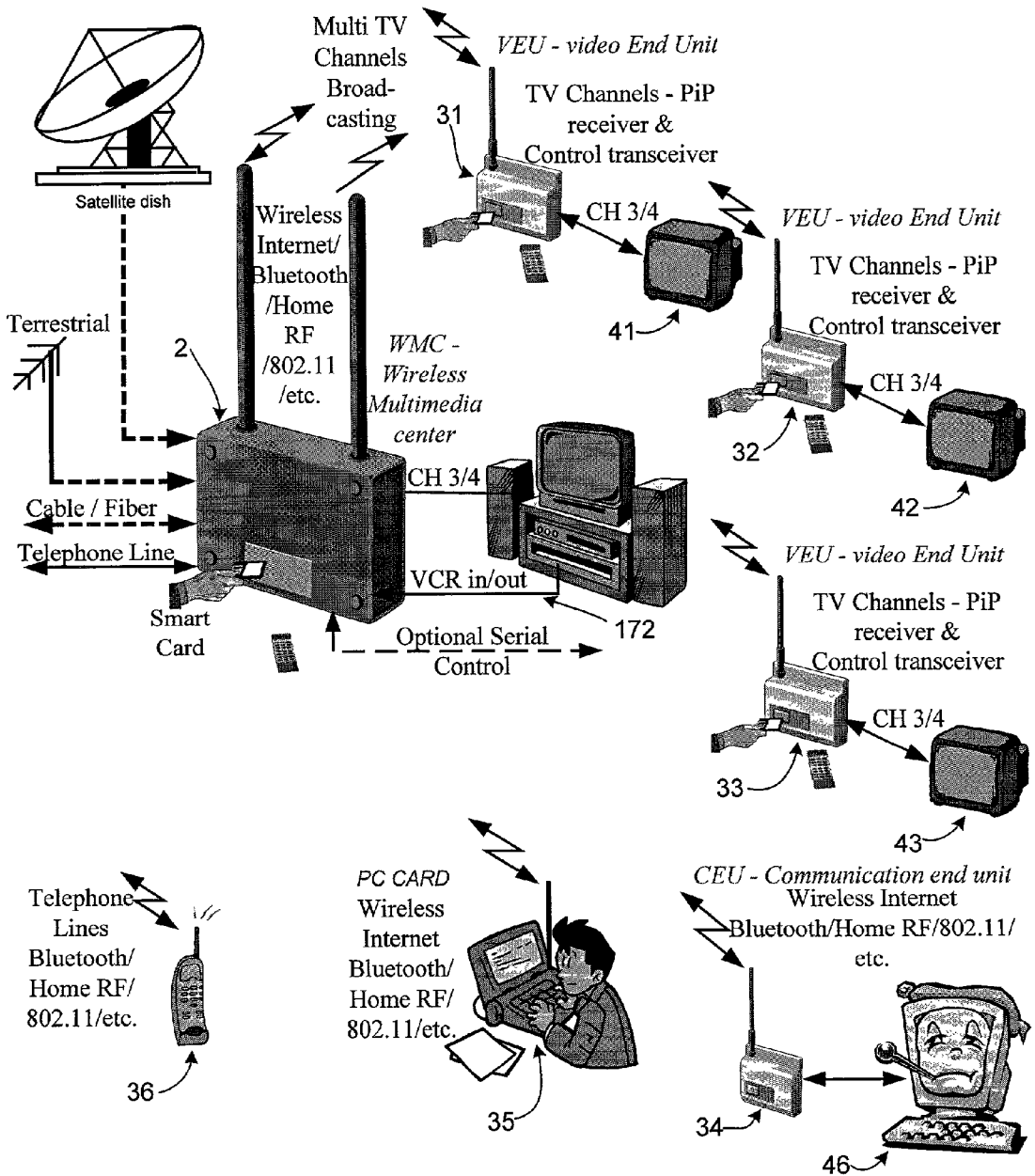
FIG. 2 is a similar block diagram for analog services.

As in FIG. 2, where the television receivers 41-43 are standard analog television sets, the Analog System would include a digital-to-analog converter 52 (FIG. 3) to convert the digital transmissions throughout the house (FIG. 2) to an analog signal interpretable by the receiver 41-43.

In FIG. 4, as digital television becomes more common, the digital-to-analog converter part of the system can be dispensed with, and all the television data can be transmitted over the network in a digital fashion. FIG. 2, entitled WMS-A shows the system adapted to analog television receivers, while FIG. 4, WMS-D shows the system adapted to digital television systems.

Figure 5:
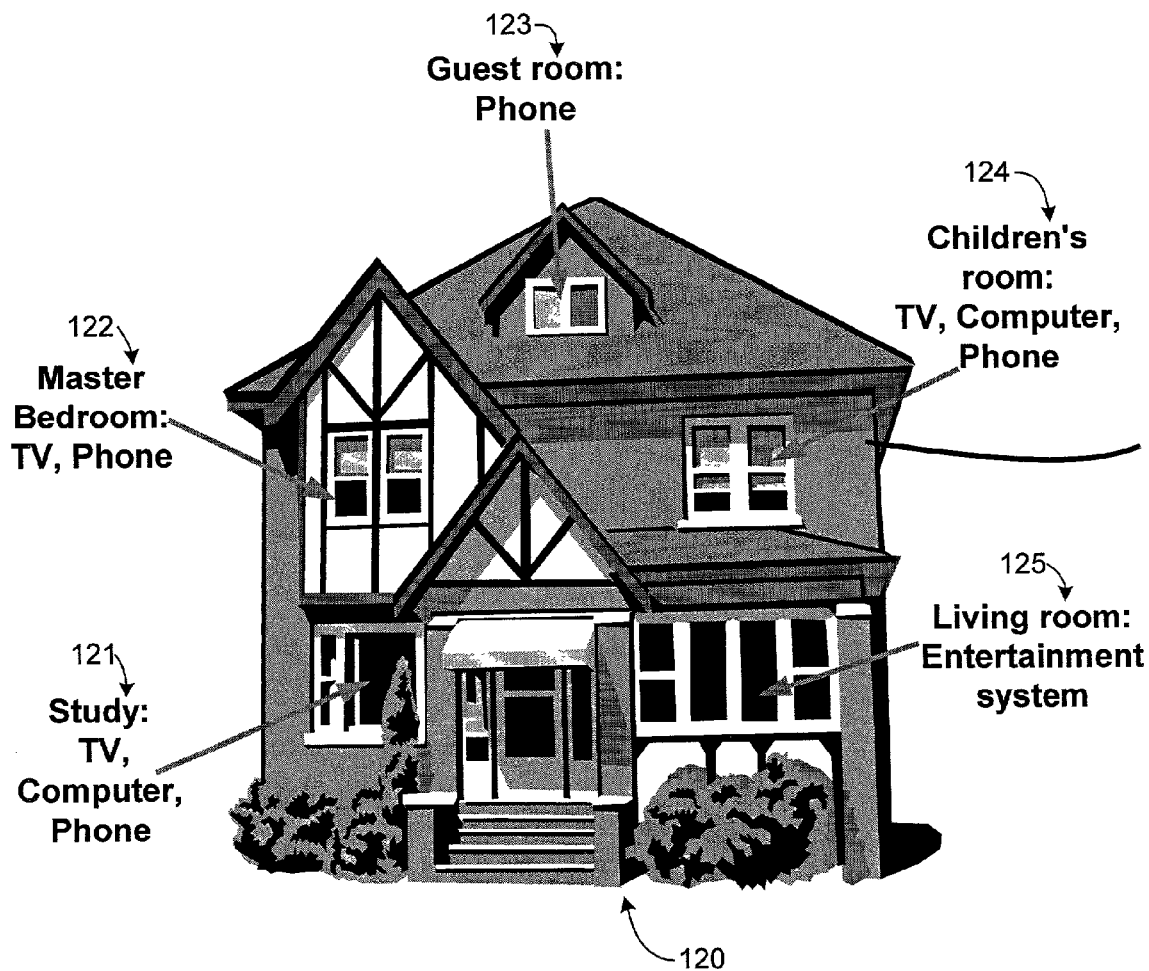
FIG. 5 is representational block diagram of the invention in a home environment.

In FIG. 5, Example: Residential Property, the services distributed throughout a house 120 are indicated. In this residential property example, a single WMC distributes the services shown to end units located as indicated 121-125 in the various rooms.

Figure 6:
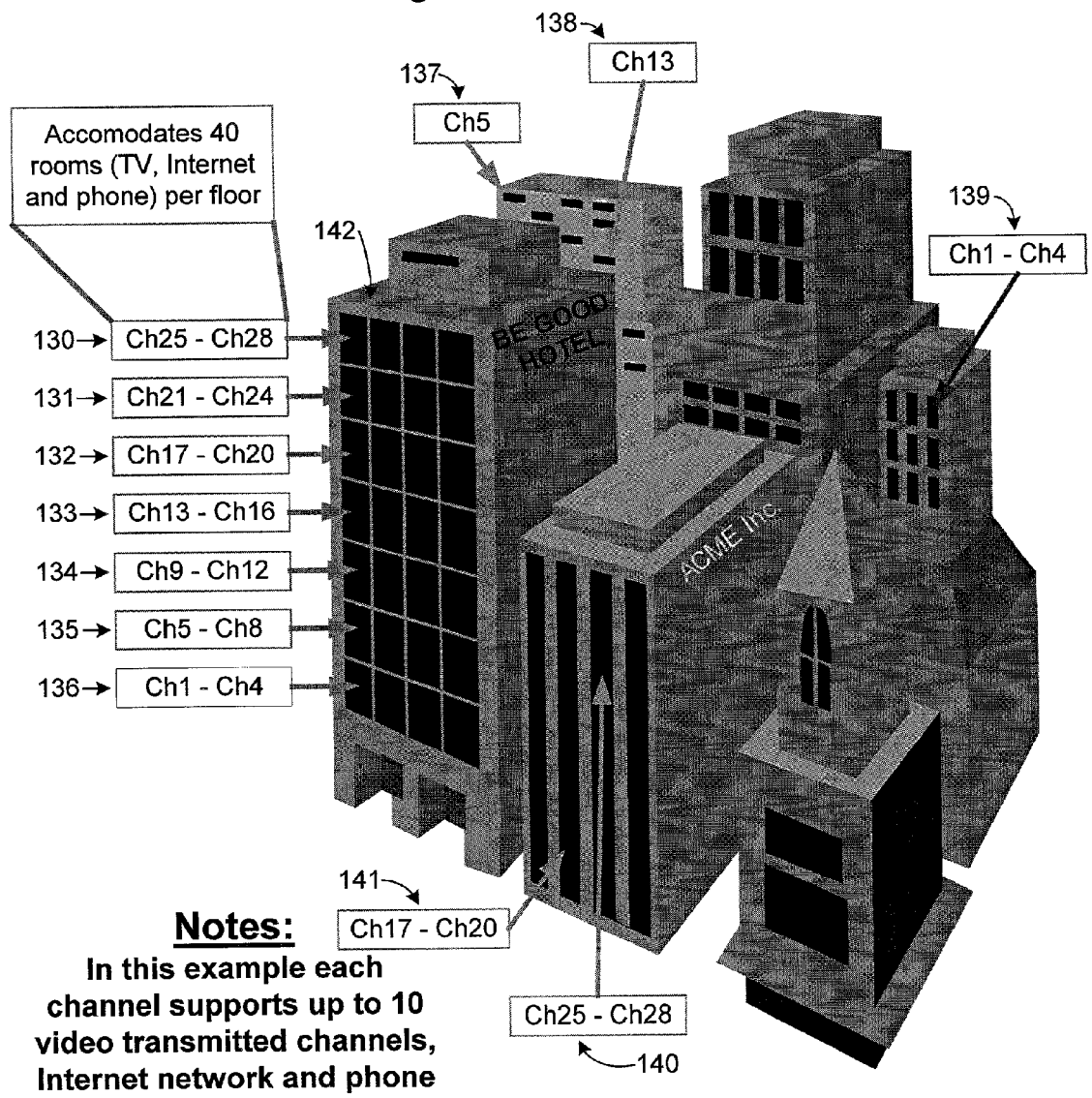
FIG. 6 is a representational block diagram of the invention in a commercial environment.

In FIG. 6, Example: a City Block . . . , channel allocation and distribution on a given city block, using different channels 130-136 to avoid cross-talk in the different user's services, in a tight geographical area, is shown. There is some attempt to separate the channels, (such as 136 vs. 139; 130 vs. 140; 132 vs. 141) by distance to avoid cross-talk, but such separation is not necessary; it only serves as an added degree of insurance, because each signal will be digitally encoded and will be incapable of being read by another digital receiver, not programmed to receive the intended signal. In a spread out system such as this, additional WMC's or special repeaters 142 may be used to reach the most distant parts of the system.

Power transmission levels are automatically chosen to minimize additional radiation to the inhabitants and to minimize interference with users of similar systems in near locations, while guaranteeing the needed quality of service. The power level minimization also combines with the aforementioned digital encoding to minimize the risk of cross-talk and interference between multiple systems in tight geographic areas.

In general a video protocol received by the WMC will be the video output by the VEU, but the system can also be a protocol converter.

Some of the features which are contemplated by the present system are:

It will be capable of carrying all analog video protocols by being electronically transparent to such protocols.

It will provide picture-in-picture service for every video end unit.

It will distribute cable, satellite, terrestrial feeds, fiber-optic or any other feed, throughout its system.

It will interface to cable/digital subscriber line or POTS modems, either internal to the computer or external to the computer.

It will provide a data feed to all end unit computers in the system area via a wideband data pipe (WDP) and thereby create a network.

It may be adapted to any data protocol such as bluetooth, home RF, 802.11, or proprietary protocol, via soft-RF. Soft RF is essentially a software conveyor that can accommodate any protocol plug-in.

As in FIG. 4, It will be smart card 150-154 controlled, so that a subscriber to a service can take his smart card 151, insert it into a local reader 161, which will identify him as being at a local system, and enable him to use his paid-for services on that system, regardless of what services the local system owner has paid to subscribe to.

Since there are no moving parts, the system will be nearly maintenance free. Software type maintenance may be remotely effected by the provider.

The system will allow a central connection for DVD 170, pre-paid programming, video camera, VCR 172 (FIG. 2), or time shifting apparatus such as a video hard drive, transmitted to one or more of the VEU's 31-33 or 81-83 in FIG. 4.

The digital system of FIG. 4 contemplates similar features with the difference that it will be able to read all digital video standards.

One of the benefits of this system will be to create a family of wireless distribution systems. The system is a two-way communication system between the providers and the users. The providers will be able to monitor the use of given copyrighted intellectual property, such as computer programs or movies, and charge royalties for the use of such intellectual property automatically, on-line, and in a way that cannot be scammed easily. The proper royalties on copyrights and on patents can be easily monitored centrally in this system, and accounted for in a trustworthy automatic way. The system could obsolete the Neilsen TV rating system.

Various chip sets and chips can be provided for the central unit, and for the video end units, to allow integration with existing television sets or for other applications requiring data transmission within the structure or area, for applications that may not even yet be contemplated. The system is modular in the use of such chips, and in the easy addition of end units.

It can operate in the unlicensed frequency bands of 5.0-5.8 gigahertz and 2.4-2.5 gigahertz or in any other appropriate frequencies that are made available by the electromagnetic spectrum licensing authorities in the various countries. Television data can use MPEG-1 and MPEG-2 compression, and/or AC3, transmission and multiplexing standards.

As described above, the system makes use of existing standards. However the system also contemplates novel transmission schemes as described below.

A proprietary modulation engine will accommodate the indoor environment.

The Inventors have come up with a proprietary design for simultaneous transmission of the video/audio, wideband data and communications.

The system enables the interception and distribution of multiple services such as telephone, radio, television, digital data, and Internet in a single control box and the distribution of those services throughout the location by wireless digital transmission, to end nodes, that are either specialized or multi-purpose, throughout the site.

The end nodes are a plurality of end units. In this system the signals include video or audio signals and broadband data. The wireless multimedia center receives all the signals and distributes segments of said signals via a transmitter.

The video signals are transmitted by orthogonal frequency division multiplexing (OFDM) in which all signals are added together and summed as an orthogonal array having dimensions of time, frequency and amplitude, to transmit spread spectrum multiplexed signals, in which each pulse including said signals has sufficiently long individual pulse widths to defeat multi-path, reflection and absorption phase induced losses. The system is capable of using COFDMA as one of the flavors of OFDM. The use of COFDMA, as discussed and proven in many public domain publications allows a better channel estimation and signal control. However, the use of COFDMA is not a requirement of the broadest claims.

The separate channel that carries the streaming media broadcast data is capable of carrying a large amount of data, as needed. The system adopts its capability to the needed bandwidth, and can go as high as 200 megabits/sec, or more.

The OFDM which carries the video signals may be a coded orthogonal frequency division multiple access (COFDMA).

The video signals are broadcast to one or more end units.

The WMC Broadcast data of the streaming media is received by the video end unit (VEU) and the data addressed to the specific VEU is extracted.

The broadband data is distributed to and received from one or more communication end units (CEU's).

The typical home unit is contemplated as having distribution capability for at least three televisions, but the invention contemplates modular add-ons that will increase this capability as needed. As for example in FIG. 6.

The system contemplates an ability to adapt to new services not known at this time.

The service contemplates a business model in which services may be charged per user, rather than per location. This would be implemented by the provision of a smart card 150-153 (FIG. 4) for each user, whereby the user could access his accustomed blend of services whenever he is in a location using the system, regardless of what services are subscribed to by the local user.

Figure 7:
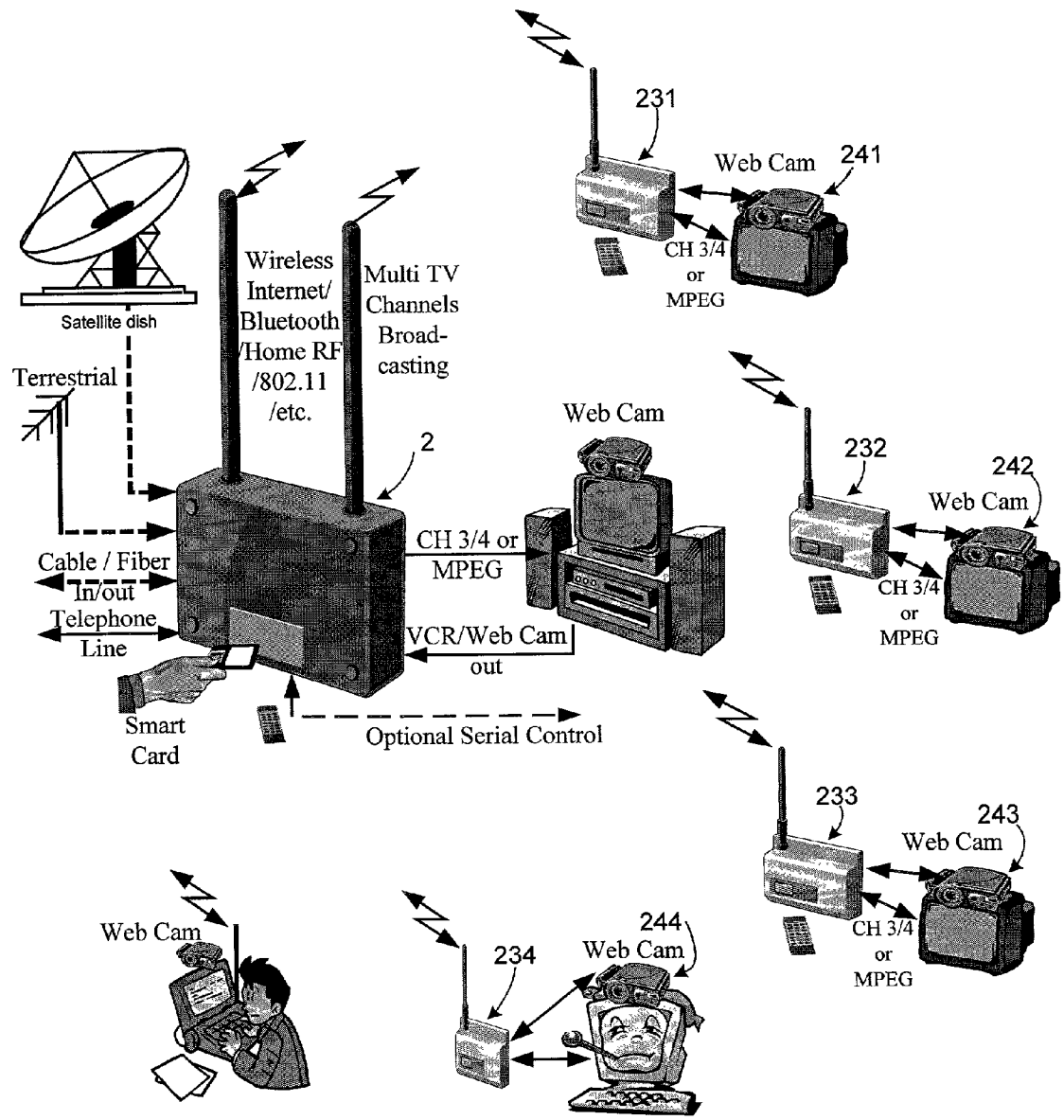
FIG. 7 is representational block diagram of the invention as an alarm and remote monitor.
Figure 8:
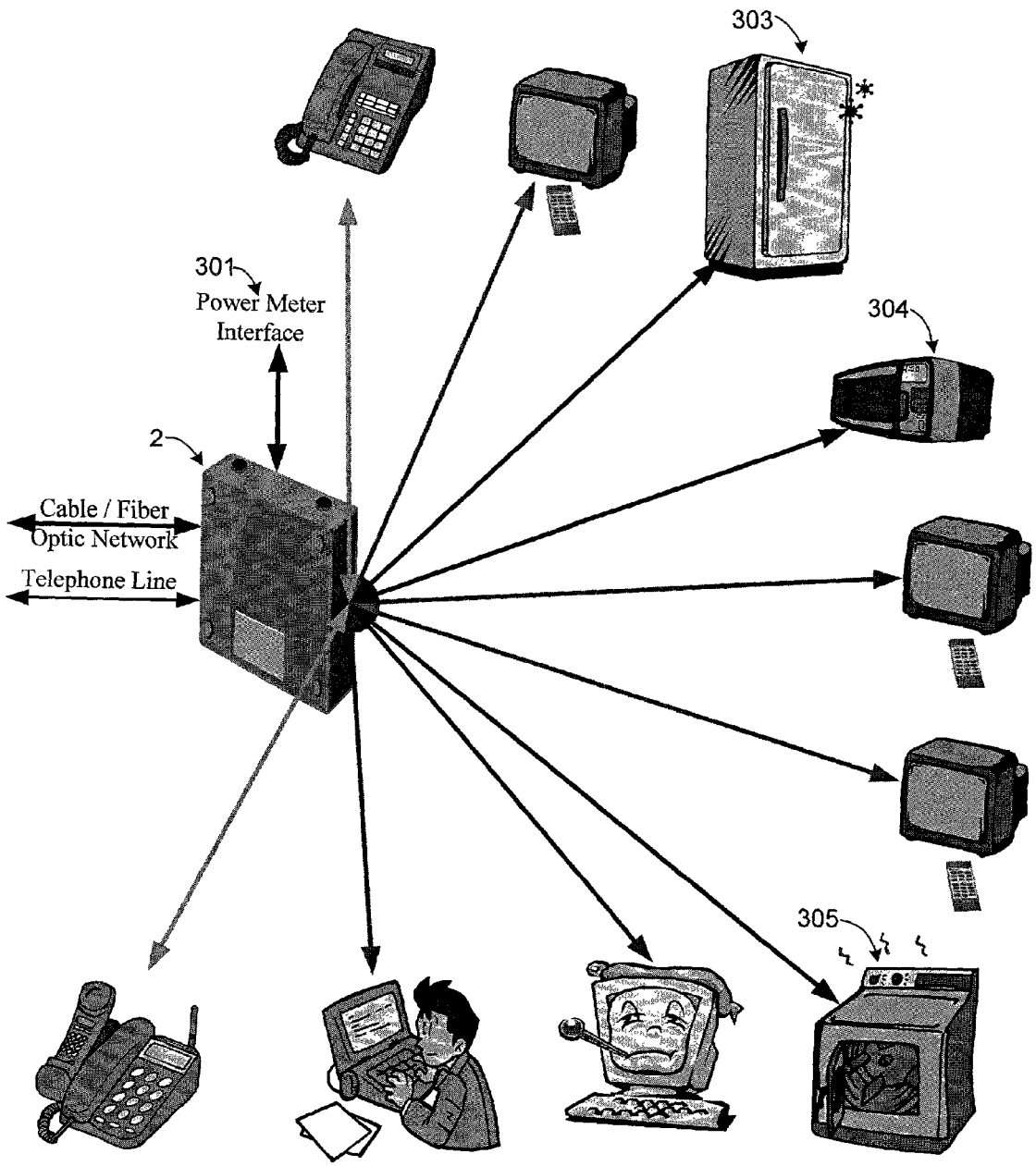
FIG. 8 is a similar diagram of the invention controlling appliances.

The system can be an alarm (FIG. 7) or monitoring system (FIGS. 7-8). Software can allow the EU's 231-234 to monitor sensors such as sound, video 241-244, sump level, motion 241-244, electrical consumption 301 (FIG. 8), gas use, water use, and temperature.

The EU's can also be capable of controlling heating, ventilation, AC and home appliances 303-305.

The smart card can allow a subscriber to control and monitor his home remotely wherever he has access to a compatible system, or over modem or Internet connection.

We claim:
1. A customer premises system in which:
the terms:
   a digital data packet is: a container of data defined by boundaries set according to a protocol;
   communicate is: to transmit digital data packets bi-directionally, with a hand-shaking mechanism for each digital data packet;
   broadcast is: to transmit digital data packets in one direction, with no hand-shaking mechanism for each digital data packet;
including:
a wireless multimedia center (WMC) for reception on said premises from one or more signal sources and for distribution of segments of signals from said signal sources through the wireless multimedia center
to a plurality of end units, in which:
the signals include video and/or audio signals (hereinafter video) and/or broadband communication data;
the wireless multimedia center receives all the signals and distributes segments of said signals via a transmitter;
the video signals are broadcast by orthogonal frequency division multiplexing (OFDM) in which all signals are added together and summed as an orthogonal array having dimensions of time, frequency and amplitude, to transmit spread spectrum multiplexed signals, in which each pulse including said signals has sufficiently long individual pulse widths to defeat multi-path, reflection and absorption phase induced losses;
and:
   the video signals are broadcast from the wireless multimedia center via one or more separate and dedicated RF channels to one or more end units;
   and
   optionally, the end units communicate simultaneously with the wireless multimedia center, via a separate bi-directional wideband data pipe (WDP) which provides, as demanded, control for the video channels, data transfer, or plain old telephone service, wherein said wireless multimedia center controls which segments of which signals are distributed to each end unit; the video signals are broadcast independently without the presence of communication signals and/or are broadcast simultaneously with the communication signals.

2. A system according to claim 1 in which the broadband data is distributed to and received from one or more communication end units (CEU's).

3. A system according to claim 2 in which the CEU has one or more connections from a group including serial, phone, infrared, and Ethernet.

4. A system according to claim 3 in which the wireless multimedia center (WMC) transmits and receives telephone service signals to the communications end unit, for use by telephones via the separate bi-directional wideband data pipe (WDP).

5. A system according to claim 3 in which the wireless multimedia center transmits broadband data signals to the communications end unit for use by data terminals, such as internet linked computers, via the separate bi-directional wideband data pipe (WDP).

6. A system according to claim 1 in which the system is modular.

7. A system according to claim 1 the end unit receiving video signals is a video end unit (VEU).

8. A system according to claim 7 in which the VEU is analog, has a digital-to-analog converter, and analog outputs including RF, RCA, and SVHS.

9. A system according to claim 7 in which the VEU is digital and has digital outputs including IEEE 1394 and MPEG.

10. A system according to claim 7 in which the VEU is also a CEU and has one or more outputs from a group including serial, phone, Ethernet, IEEE 1394, MPEG, RF, RCA, and SVHS.

11. A system according to claim 7 having a remote control unit for each video end unit (VEU).

12. A system according to claim 7 in which the VEU is voice command controlled.

13. A system according to claim 7 in which the VEU is incorporated into a TV set.

14. A system according to claim 7 in which the Video End Unit supports picture-in-picture.

15. A system according to claim 1 in which the system has a separate bi-directional wideband data pipe (WDP) which provides, as demanded, control for the video channels, data transfer, or plain old telephone service.

16. A system according to claim 15 in which the separate bi-directional wideband data pipe is encrypted.

17. A system according to claim 15 in which the separate bi-directional wideband data pipe is soft RF.

18. A system according to claim 1 in which the WMC is incorporated into a TV set.

19. A system according to claim 1 in which the OFDM is a coded orthogonal frequency division multiple access (COFDMA).

20. A system according to claim 1 which is capable of a data transfer rate of 200 megabits/second or more.

21. A system according to claim 1 in which the wireless multimedia center (WMC) transmits conventional coded digital cordless telephone signals to conventional cordless telephones.

22. A system according to claim 1 in which the wireless multimedia center or the end unit reads a user smart card for instruction as to a level of service authorized to said user, so that the user can utilize his authorized level of service on any premises in which he can place his user smart card in the system.

23. A system according to claim 22 in which each user smart card has its own viewing rules, so, for example, a customer can exercise parental control over youthful holders of user smart card on the customer's account.

24. A system according to claim 1 in which the wireless multimedia center communicates viewing information about use per TV set, to a service provider, for use in evaluating television viewing habits, as for example for obtaining television ratings in real time.

25. A system according to claim 1 in which the wireless multimedia center communicates viewing information from the premises for use in royalty distribution assessment.

26. A system according to claim 1 in which the viewing information is used by the provider to personalize advertising to the viewer in any media, for example phone messages or TV graphics.

27. A system according to claim 1 in which the wireless multimedia center distributes to a premises having over 200 sub-premises, each of which sub-premises receives individually selected programming and data and telephone service.

28. A system according to claim 1 in which the one of the dimensions of the transmission is direction.

29. A system according to claim 1 in which the one of the dimensions of the transmission is power, in which power transmission levels are at energy levels just above background radiation;
said power transmission levels are automatically manipulated to minimize additional radiation to inhabitants, and to minimize interference with users of similar systems in near locations, while guaranteeing a needed quality of service.

30. A system according to claim 29 in which the OFDM broadcasts any digital video signal, such as DVB, DV and/or ATSC.

31. A system according to claim 1 in which the one of the dimensions of the transmission is polarization.

32. A system according to claim 1 in which the system has a startup procedure including one or more steps from the following group:
the wireless multimedia center seeks the end units by broadcasting instructions and listening to responses of the end units;
the wireless multimedia center registers said end units;
the wireless multimedia center dynamically tests error rates to see which direction and polarization and power levels are best;
the EU announces its presence and registers with the appropriate WMC.

33. A system according to claim 1 in which the OFDM broadcasts any analog video broadcast signal, such as NTSC, PAL and/or SECAM.

34. A system according to claim 1 in which the system includes an alarm or monitoring system via the separate bi-directional wideband data pipe (WDP).

35. A system according to claim 1 which is capable of controlling heating, ventilation, AC and home appliances via the separate bi-directional wideband data pipe (WDP).

36. A system according to claim 1 which is capable of monitoring for sound, video, sump level, motion and temperature via the separate bi-directional wideband data pipe (WDP).

37. A system according to claim 1 in which the data can be encrypted between service provider and WMC; encrypted to differentiate between VEUs; encrypted to prevent eavesdropping, and encrypted to minimize interference.

38. A system according to claim 1 in which
the OFDM broadcasts odor signals to the VEU;
data from a dynamic feedback odor sensor at the VEU is monitored by the system via the separate bi-directional wideband data pipe (WDP);
the data channel transmits control signals to adjust a ventilation rate to clear old odors as video scenes change.

39. A system according to claim 1 with multilevel WMC's or with repeaters, to distribute signals to a widely spaced premises.

40. A system according to claim 1 in which the WMC is adapted to serve as a VEU for a local TV.

41. A system according to claim 1 in which the system supports services such as central DVD, Time shift programming, and the like, broadcast to the VEU's.

42. A system according to claim 1 in which the system software can be updated, upgraded and maintained remotely by the service provider.

43. A customer premises system in which:
a digital data packet is: a container of data defined by boundaries set according to a protocol;
communicate is: to transmit digital data packets bi-directionally, with a hand-shaking mechanism for each digital data packet;

broadcast is: to transmit digital data packets of data in one direction, with no hand-shaking mechanism for each digital data packet;
including:
a wireless multimedia center (WMC) for reception on said premises from one or more signal sources and for distribution of segments of signals from said signal sources through the wireless multimedia center
to a plurality of end units, in which:
the signals include video signals and broadband data;
the wireless multimedia center receives all the signals and distributes segments of said signals via a transmitter;
the video signals are broadcast by orthogonal frequency division multiplexing (OFDM) in which
all signals are added together and summed as an orthogonal array having dimensions of time, frequency and amplitude, to transmit spread spectrum multiplexed signals, in which each pulse including said signals has sufficiently long individual pulse widths to defeat multi-path, reflection and absorption phase induced losses;
and;
   the video signals are broadcast from the wireless multimedia center via one or more separate and dedicated RF channels to one or more end units;
and
   optionally, the end units simultaneously communicate with the wireless multimedia center, via a separate bi-directional wideband data pipe (WDP); wherein said wireless multimedia center controls which segments of which signals are distributed to each end unit; the video signals are broadcast independently without the presence of communication signals and/or are broadcast simultaneously with the communication signals;
the broadband data is distributed to and received from one or more communication end units (CEU's);
the end unit receiving video signals is a video end unit (VEU);
all the transmissions are encrypted;
the separate bi-directional wideband data channel is soft RF;
a remote control unit controls each video end unit (VEU);
the OFDM is a coded orthogonal frequency division multiple access (COFDMA);
the system is capable of a data transfer rate of 200 megabits/second or more;
the wireless multimedia center (WMC) transmits and receives telephone service signals to the communications end unit, for use by telephones;
the wireless multimedia center transmits broadband data signals to the communications end unit for use by data terminals, such as network linked computers;
the wireless multimedia center (WMC) transmits conventional coded digital cordless telephone signals to conventional cordless telephones;
the wireless multimedia center or the end unit reads a user smart card for instruction as to a level of service authorized to said user, so that the user can utilize his authorized level of service on any premises in which he can place his user smart card in the system;
the wireless multimedia center communicates viewing information about use per TV set, to a service provider, for use in evaluating television viewing habits, as for example for obtaining television ratings in real time;
the wireless multimedia center communicates viewing information from the premises for use in royalty distribution assessment;
the viewing information is used by the provider to personalize advertising to the viewer in any media, for example phone messages or TV graphics;
one of the dimensions of the transmission is direction;
one of the dimensions of the transmission is power;
one of the dimensions of the transmission is polarization;
the system has a startup procedure including one or more steps from the following group:
   the wireless multimedia center seeks the end units by broadcasting instructions and listening to responses of the end units;
   the wireless multimedia center registers said end units;
   the wireless multimedia center dynamically tests error rates to see which direction and polarization and power levels are best;
   the EU announces its presence and registers with the appropriate WMC;
the OFDM carries any analog video broadcast standard signal, such as NTSC, PAL and/or SECAM;
the OFDM carries any digital video standard signal, such as DVB, DV and/or ATSC;
the system is an alarm and monitoring system which is capable of controlling heating, ventilation, AC and home appliances;
which is capable of monitoring for sound, video, sump level, motion and temperature;
in which the data can be encrypted between service provider and WMC; encrypted to differentiate between VEUs; encrypted to prevent eavesdropping, and encrypted to minimize interference;
the Video End Unit supports picture-in-picture;
in which each user smart card has it's own viewing rules, so, for example, a customer can exercise parental control over youthful holders of the user smart card on the customer's account;
the WMC is adapted to serve as a VEU for a local TV;
the system supports services such as central DVD, time shift programming, and the like;
the system software can be updated and upgraded and maintained remotely by the service provider.

\* \* \* \* \*